United States Patent Office 2,912,442
Patented Nov. 10, 1959

2,912,442

2,3,6,7 NAPHTHALENETETRACARBOXYLIC ACID AND ITS FUNCTIONAL DERIVATIVES

Owen Wright Webster, Wilmington, Del., assignor to E. I. du Pont de Nemours and Company, Wilmington, Del., a corporation of Delaware No Drawing. Application November 23, 1956
Serial No. 623,811

8 Claims. (Cl. 260—346.3)

This invention relates to a new aromatic polycarboxylic acid and its derivatives, and to a method for the preparation of these compounds.

An object of this invention is to prepare a novel naphthalene tetracarboxylic acid and its derivatives. A further object is to prepare such novel compounds having valuable properties as curing agents, plasticizers and useful intermediates in the preparation of resins and vat dyes. These and further objects are more fully disclosed below.

The new products of this invention are 2,3,6,7-naphthalenetetracarboxylic acid and its derivatives hydrolyzable to the acid, particularly its anhydride and esters. These products have the general formula

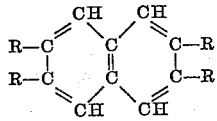

where the R's are carboxyl groups or groups which upon hydrolysis are converted to carboxyl groups. The invention also includes a method of preparing 2,3,6,7-naphthalenetetracarboxylic acid which comprises dehydrogenating 1,2,3,4,5,6,7,8 - octahydro - 2,3,6,7 - naphthalenetetracarboxylic dianhydride by reaction with a halogen of atomic number 17–35, i.e., chlorine or bromine, at a temperature of at least 150° C., and hydrolyzing the resulting 2,3,6,7-naphthalenetetracarboxylic diahydride.

The dehydrogenation reaction is represented by the following equation, in which bromine is used as the illustrative halogen:

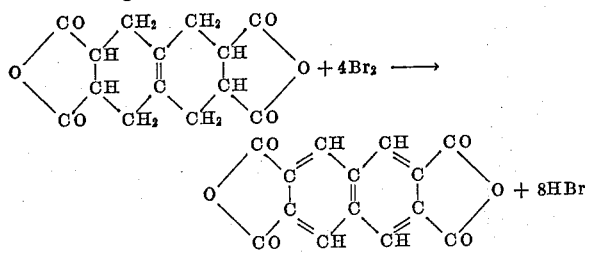

The starting material, 1,2,3,4,5,6,7,8-octahydro-2,3,6,7-naphthalenetetracarboxylic dianhydride, can be prepared from allene and maleic anhydride by the method described by Alder and Ackerman in Berichte 87, 1567 (1954). It is a solid melting at 239–240° C. The corresponding tetracarboxylic acid can be used instead of the dianhydride in the process of this invention.

It is noteworthy that reaction with a halogen at high temperature is the only method, so far as is now known, capable of effecting complete dehydrogenation of 1,2,3,4, 5,6,7,8 - octahydro - 2,3,6,7 - naphthalenetetracarboxylic dianhydride without decarboxylation. More conventional dehydrogenating methods, such as heating in the presence of sulfur, selenium dioxide or palladium-on-charcoal, lead either to an incompletely dehydrogenated or to a decarboxylated product (see Alder and Ackerman, already cited).

Either chlorine or bromine can be used as the dehydrogenating agent. Chlorine is advantageous for use in large scale operations because of its lower cost, but bromine is more easily handled in small scale work, and moreover the by-product hydrogen bromide, which is of high purity, is itself a valuable chemical. The halogen is normally used in slight excess, in order to achieve complete conversion of the starting material, but this is by no means essential. The reaction is normally continued until the evolution of hydrogen halide has substantially ceased.

A reaction catalyst is not necessary. If desired a small amount of thionyl chloride may be added to the reaction mixture to facilitate the halogenation but this is not essential, and the beneficial action of this agent has not been demonstrated.

The reaction temperature is important. While halogenation takes place at relatively low temperatures, e.g., in the range of 75–120° C., the major proportion of the products formed at these temperatures either contain substantial amounts of bound halogen or are incompletely dehydrogenated and only minor amounts of the desired product are obtained. It has been found necessary to operate at a temperature of at least 150° C. to obtain high yields of completely dehydrogenated and halogen-free products, and best results are obtained at temperatures above 175° C. Maximum temperature is not critical provided it does not exceed the decomposition temperature of the starting material and reaction product. In practice, it is unnecessary to exceed 300° C., and the preferred operating temperature is 175–250° C.

The reaction is preferably carried out in a medium, which is liquid at the operating temperature, in which the octahydronaphthalenetetracarboxylicdianhydride is soluble at least to some extent, e.g., to the extent of at least 5% at the operating temperature. The solvent should be essentially unreactive toward the anhydride group and preferably, though not necessarily, substantially resistant to halogenation. The most desirable solvents are chlorinated or brominated hydrocarbons, and the most useful ones are the chlorinated aromatic hydrocarbons liquid at room temperature (about 20° C.) and boiling above 175° C. Suitable specific solvents include o-bromodiphenyl, o-bromotoluene, the bromoxylenes, o-dibromobenzene, tribromoethylene, tetrabromoethylene, α-chloronaphthalene, the dichlorobenzenes, the trichlorobenzenes, the tetrachlorobenzenes, 4,4'-dichlorodiphenyl, 1,5-dichloropentane, and the like. The solvent, as well as the entire reaction mixture, should of course be essentially anhydrous.

The reaction is normally carried out at or near atmospheric pressure, and the hydrogen halide is permitted to escape as it forms. If desired, however, it is possible to operate in sealed, corrosion-resistant vessels under the autogeneous pressure which develops at the operating temperature, since the presence of the hydrogen halide does not interfere with the reaction.

The 2,3,6,7-naphthalenetetracarboxylic dianhydride is isolated by separating it from the reaction medium, if necessary by removing the latter by distillation. The anhydride is a high melting solid which can be purified by recrystallization from appropriate solvents. However, it is in general obtained directly in a state of purity sufficient for most uses.

The anhydride can then be hydrolyzed by the usual methods of 2,3,6,7-naphthalenetetracarboxylic acids, from which a number of other derivatives hydrolyzable to the acid can be prepared.

The following examples illustrate the invention.

*Example 1*

To a suspension of 276 g. (1 mole) of 1,2,3,4,5,6,7,8- octahydro-2,3,6,7-naphthalenetetracarboxylic dianhydride in 2 liters of trichlorobenzene was added 10 ml. of thionyl chloride. The temperature of the mixture was gradually raised to the refluxing point, 210–215° C., and to the hot and stirred solution 660 g. of bromine was added at such a rate as to maintain a fairly vigorous evolution of hydrogen bromide. This lasted seven hours, and during the addition of the last 60 g. of bromine the evolution of hydrogen bromide became very slow, indicating substantial completion of the reaction. The mixture was refluxed and stirred three hours after the addition had been completed. It was then cooled, and the crude 2,3,6,7-naphthalenetetracarboxylic dianhydride, which is insoluble in trichlorobenzene, was collected on a filter. After drying in a vacuum oven at 110° C. for 6 hours, it weighed 273 g. Ultraviolet analysis of this product showed that it was 80–90% naphthalenetetracarboxylic dianhydride. A sample for analysis was prepared by three recrystallizations from acetic anhydride. It was light orange in color and decomposed above 320° C. when heated in a sealed tube.

*Analysis.*—Calc'd for $C_{14}H_4O_6$: C, 62.80; H, 1.51; N.E., 67.1. Found: C, 63.95; H, 2.25; N.E., 65.0.

The structure was further confirmed by infrared analysis, which showed aromatic C—H bands and an anhydride carbonyl band. Methylene C—H bands were not present.

*Example 2*

A suspension of 5.05 g. of crude 2,3,6,7-naphthalenetetracarboxylic dianhydride in about 200 ml. of water containing a few drops of hydrochloric acid was refluxed until a clear solution formed. On cooling the solution, there was obtained 3.5 g. of 2,3,6,7-naphthalenetetracarboxylic acid as light brown crystals. Most of the color was removed by recrystallization from an aqueous solution that had been treated with decolorizing carbon. A third recrystallization gave a nearly colorless product.

*Analysis.*—Calc'd for $C_{14}H_8O_8$: C, 55.20; H, 2.66; N.E., 76.0. Found: C, 54.46; H, 2.86; N.E., 77.0.

The structure was further confirmed by ultraviolet and infrared analysis.

*Example 3*

The methyl ester of 2,3,6,7-naphtalenetetracarboxylic acid was prepared by refluxing for 12 hours a solution of 1 g. of the acid in 30 ml. of methanol containing 1 ml. of concentrated sulfuric acid. White crystals of tetramethyl 2,3,6,7-naphthalenetetracarboxylate separated from the solution on standing at room temperature. After two recrystallizations from ethanol, these crystals melted at 179–180.5° C.

*Analysis.*—Calc'd for $C_{18}H_{16}O_8$: C, 59.30; H, 4.45. Found: C, 59.73; H, 4.43.

This invention makes available 2,3,6,7-naphthalenetetracarboxylic acid and its derivatives hydrolyzable thereto, including the anhydride, esters, amide, nitrile and acyl halides of 2,3,6,7-naphthalenetetracarboxylic acid. These derivatives can be prepared from the anhydride or acid by conventional methods. The preferred products of this invention can be represented by the general formula

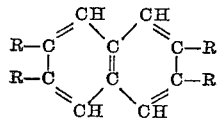

wherein the R's, which may be the same or different, are —COOH, —CO-halogen (particularly —COCl and —COBr), —CONH$_2$, —CN, and —COOR$_1$, where R$_1$ is a hydrocarbyl group, i.e., hydrocarbon radical, particularly one having from 1 to 6 carbon atoms and more particularly an alkyl radical from 1 to 6 carbon atoms, and on adjacent carbon atoms the R's may be joined to form an anhydride, —CO—O—CO—, group. Specific products of this invention, besides those illustrated in the examples, include the acid chloride and acid bromide of 2,3,6,7-naphthalenetetracarboxylic acid; 2,3,6,7-tetracarbamylnaphthalene; 2,3,6,7-tetracyanonaphthalene; the ethyl, propyl, isopropyl, n-butyl, sec.-butyl, isobutyl, n-amyl, n-hexyl, cyclohexyl, and phenyl esters of 2,3,6,7-naphthalenetetracarboxylic acid; and the like. The anhydride and esters are the most readily accessible and generally useful of the derivatives of 2,3,6,7-naphthalenetetracarboxylic acid.

These products are useful, both in themselves and as intermediates to other useful products, in a variety of applications. For example, 2,3,6,7-naphthalenetetracarboxylic acid and its anhydride are valuable curing agents for epoxy resins, such as the condensation products of bis(4-hydroxyphenyl)-2,2-propane with epichlorohydrin. The acid esters and anhydride react with glycols to give high softening condensation products of the alkyd resin type for use in finishes and coatings. 2,3,6,7-naphthalenetetracarboxylic acid, or its anhydride, reacts with benzene in the presence of aluminum chloride to give a dibenzoyl derivative which, upon ring closure under the influence of condensing agents, gives the disanthraquinone

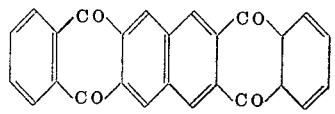

The latter is an intermediate in the preparation of vat dyes. The esters, e.g., the methyl ester of 2,3,6,7-naphthalenetetracarboxylic acid, are useful plasticizers for resins of the polyester type.

I claim:

1. A process for making 2,3,6,7-naphthalenetetracarboxylic dianhydride which comprises treating at temperatures of from 150° to 300° C. 1,2,3,4,5,6,7,8-octahydro-2,3,6,7-naphthalenetetracarboxylic dianhydride with a halogen of the group of chlorine and bromine.

2. The method of claim 1 wherein the temperature of reaction is between 175–250° C.

3. A method of preparing 2,3,6,7-naphthalenetetracarboxylic acid comprising treating at temperatures of from 150° to 300° C. 1,2,3,4,5,6,7,8-octahydro-2,3,6,7-naphthalenetetracarboxylic dianhydride with a halogen of the group consisting of chlorine and bromine and hydrolyzing the resulting 2,3,6,7-naphthalenetetracarboxylic dianhydride.

4. The process of claim 3 wherein the temperature of dehydrogenation is between 175–250° C.

5. 2,3,6,7-naphthalenetetracarboxylic acid.

6. 2,3,6,7-naphthalenetetracarboxylic dianhydride.

7. Tetramethyl 2,3,6,7-naphthalenetetracarboxylate.

8. A compound of the group consisting of 2,3,6,7-naphthalenetetracarboxylic acid, 2,3,6,7-naphthalenetetracarboxylic anhydride, 2,3,6,7-naphthalenetetracarbonitrile, 2,3,6,7-naphthalenetetracarbamide, 2,3,6,7-naphthalenetetracarbacyl chloride, 2,3,6,7-naphthalenetetracarbacyl bromide and esters of 2,3,6,7-naphthalenetetracarboxylic acid, said esters having the formula

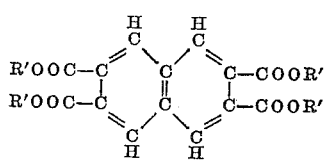

wherein the R's are members of the class consisting of alkyl radicals of 1–6 carbon atoms, phenyl and cyclohexyl radicals.

References Cited in the file of this patent

Fieser et al.: J.A.C.S., vol. 61, pp. 1272–81 (1939).
Morton et al.: J.A.C.S., vol. 64, pp. 2250–3 (1942).
Beilstein: Vol. 9, p. 1002, mainwork (1926).
Beilstein: Vol. 17–19, p. 706, 1st suppl. (1934).